US007523055B2

(12) United States Patent
Anderson et al.

(10) Patent No.: US 7,523,055 B2
(45) Date of Patent: Apr. 21, 2009

(54) FINANCIAL INFORMATION ACCESS SYSTEM (75) Inventors: William P. Anderson, Kansas City, MO (US); Jacob B. Geller, Monteclair, NJ (US); G. Cotter Cunningham, Kansas City, MO (US); Kris Rodgers, Kansas City, MO (US); Brian Mason, Des Plaines, IL (US)

(73) Assignee: Block Financial LLC, Kansas City, MO (US)

( * ) Notice: Subject to any disclaimer, the term of this patent is extended or adjusted under 35 U.S.C. 154(b) by 403 days.

(21) Appl. No.: 10/765,011

(22) Filed: Jan. 26, 2004

(65) Prior Publication Data

US 2004/0158524 A1 Aug. 12, 2004

Related U.S. Application Data (63) Continuation of application No. 08/541,045, filed on Oct. 11, 1995, now abandoned.

(51) Int. Cl.
*G06Q 40/00* (2006.01)
(52) U.S. Cl. .......................... 705/35; 705/30
(58) Field of Classification Search .......... 705/10–44
See application file for complete search history.

(56) References Cited

U.S. PATENT DOCUMENTS

| 4,346,442 | A | | 8/1982 | Musmanno | 364/408 |
|---|---|---|---|---|---|
| 4,727,243 | A | | 2/1988 | Savar | 235/379 |
| 4,823,122 | A | | 4/1989 | Mann et al. | 340/825.28 |
| 4,953,085 | A | * | 8/1990 | Atkins | 705/36 R |
| 4,975,904 | A | | 12/1990 | Mann et al. | 370/85.1 |
| 4,975,905 | A | | 12/1990 | Mann et al. | 370/85.1 |
| 4,989,141 | A | * | 1/1991 | Lyons et al. | 705/36 R |
| 5,058,108 | A | | 10/1991 | Mann et al. | 370/85.1 |
| 5,136,716 | A | | 8/1992 | Harvey et al. | 395/800 |
| 5,187,787 | A | | 2/1993 | Skeen et al. | 395/600 |
| 5,214,269 | A | * | 5/1993 | Yamashita et al. | 235/379 |
| 5,220,501 | A | | 6/1993 | Lawlor et al. | 364/408 |
| 5,230,048 | A | | 7/1993 | Moy | 395/600 |
| 5,257,369 | A | | 10/1993 | Skeen et al. | 395/650 |
| 5,283,829 | A | | 2/1994 | Anderson | 380/24 |
| 5,336,870 | A | | 8/1994 | Hughes et al. | 235/379 |
| 5,339,392 | A | | 8/1994 | Risberg et al. | 395/161 |

(Continued)

OTHER PUBLICATIONS

Quicken by Intuit, User's Guide Version 2 for Windows., 1992, ISBN 0-929804-32-5, p. 206.*

(Continued)

*Primary Examiner*—Frantzy Poinvil
(74) *Attorney, Agent, or Firm*—Standley Law Group LLP (57) ABSTRACT

A system is disclosed in which a user of an information service may access financial data relating to recent credit and debit card transactions. Any entity with a TCP/IP connection to the Internet may access the system so that world-wide accessibility to the financial services is possible. Alternatively, the system may be accessed through an online information service. The financial data are processed daily by a financial services provider, then transmitted to a host computer connected to an information service. The user connects to the information service host computer to access the financial data for transactions that may have been posted as recently as the previous day. The user may also download the financial data directly to an accounting or word-processing program for further processing.

40 Claims, 6 Drawing Sheets

U.S. PATENT DOCUMENTS

| | | | | |
|---|---|---|---|---|
| 5,351,186 | A | 9/1994 | Bullock et al. | 364/401 |
| 5,383,113 | A | 1/1995 | Kight et al. | 364/401 |
| 5,404,523 | A | 4/1995 | DellaFera et al. | 395/650 |
| 5,425,028 | A | 6/1995 | Britton et al. | 370/94.1 |
| 5,434,974 | A | 7/1995 | Loucks et al. | 395/200 |
| 5,437,029 | A | 7/1995 | Sinha | 395/600 |
| 5,455,903 | A | 10/1995 | Jolissaint et al. | 395/155 |
| 5,457,797 | A | 10/1995 | Butterworth et al. | 395/650 |
| 5,464,087 | A * | 11/1995 | Bounds et al. | 194/200 |
| 5,528,490 | A | 6/1996 | Hill | 364/403 |
| 5,535,407 | A | 7/1996 | Yanagawa et al. | 395/800 |
| 5,537,533 | A | 7/1996 | Staheli et al. | 714/5 |
| 5,570,465 | A | 10/1996 | Tsakanikas | 395/114 |
| 5,590,133 | A | 12/1996 | Billstrom | 370/349 |
| 5,590,197 | A | 12/1996 | Chen et al. | 380/24 |
| 5,611,052 | A | 3/1997 | Dykstra et al. | 395/238 |
| 5,659,731 | A | 8/1997 | Gustafson | 395/604 |
| 5,668,952 | A | 9/1997 | Slane | 395/200.75 |
| 5,696,965 | A | 12/1997 | Dedrick | 395/610 |
| 5,701,451 | A | 12/1997 | Rogers et al. | 395/600 |
| 5,706,434 | A | 1/1998 | Kremen et al. | 395/200.09 |
| 5,706,442 | A | 1/1998 | Anderson et al. | 395/227 |
| 5,708,825 | A | 1/1998 | Sotomayor | 395/762 |
| 5,727,158 | A | 3/1998 | Bouziane et al. | 395/200.55 |
| 5,729,689 | A | 3/1998 | Allard et al. | 395/200.58 |
| 5,745,654 | A | 4/1998 | Titan | 395/22 |
| 5,749,075 | A | 5/1998 | Toader et al. | 705/14 |
| 5,754,850 | A | 5/1998 | Janssen | 395/615 |
| 5,797,133 | A | 8/1998 | Jones et al. | 705/38 |
| 5,812,776 | A | 9/1998 | Gifford | 395/200.47 |
| 5,842,185 | A | 11/1998 | Chancey et al. | 705/40 |
| 5,870,721 | A | 2/1999 | Norris | 705/38 |
| 5,878,403 | A | 3/1999 | DeFrancesco et al. | 705/38 |
| 5,924,082 | A | 7/1999 | Silverman et al. | 705/37 |
| 5,940,811 | A | 8/1999 | Norris | 705/38 |
| 5,966,699 | A | 10/1999 | Zandi | 705/38 |
| 5,995,947 | A | 11/1999 | Fraser et al. | 705/38 |
| 6,014,645 | A | 1/2000 | Cunningham | 705/38 |
| 6,023,684 | A | 2/2000 | Pearson | 705/35 |
| 6,131,115 | A | 10/2000 | Anderson et al. | 709/217 |
| 6,199,077 | B1 | 3/2001 | Inala et al. | 707/501 |
| 6,278,993 | B1 | 8/2001 | Kumar et al. | 707/3 |
| 6,317,783 | B1 | 11/2001 | Freishtat et al. | 709/218 |

OTHER PUBLICATIONS

"Banks Offer Customers Internet Access." *Multimedia Daily*, May 22, 1995. ISSN: 1079-4212.
"Online Service Allows Account Review (Block Financial Corp.)." *Card News*, v.9, n.21, p. 3, Oct. 31, 1994.
"On-Line Services Give Card Holders Transaction Info." *Newsbyte News Network*, Feb. 1995.
Sirbu et al. "NetBill: An Internet Commerce System Optimized for Network-Delivered Services," *IEEE Personal Communications*, v.2, issue 4, Aug. 1995, pp. 34-39.
Slone et al. "Handbook of Local Area Networks," *Auerbach Publicationsk*, 1991, ISBN 0-7913-0868-5.
Zutell, Irene. "AMEX Says On-Line Booking Keeps Travel Agents in the Loop," *Travel Agent*, Feb. 6, 1995. ISSN: 1053-9360.
The Cushing Group, Inc., "Introduction to Distributed Client/Server Computing with ObjectBroker," ObjectWorld San Francisco, Jul. 1994 (PowerPoint slides).
The Cushing Group, Inc., "Using CORBA to Integrate Legacy Systems," ObjectWorld Boston, Mar. 22, 1995 (PowerPoint slides).
The Cushing Group, Inc., "Lessons Learned Deploying a Large-Scale Distributed Object Computing Environment," ObjectWorld Boston, May 1996 (PowerPoint slides).
Michael L. Ronayne and Erik S. Townsend, "Preserving the past, designing the future," Object Magazine., Sep. 1995.
"Wells Fargo: Innovations in Customer Management," American Banker, Nov. 3, 1997.
Berkov, Barry, "CompuServe." Keynote address given at *Internet Telecom 95*. Geneva Arena, Geneva, Switzerland, Oct. 8, 1995.
Birrel, A. D., and Nelson, B., "Implementing Remote Procedure Calls," ACM Transactions on Computer Systems, vol. 2, No. 1, pp. 39-59 (1984).
*Business Example: A Case Study*. Slide Show. US:The Cushing Group, Inc., 1994-1997.
CORBAservices specification—v1.0, Mar. 1995, Available as pdf from http://cgi.omg.org/cgi-bin/doc?formal/97-02-08.pdf. Last access Jan. 30, 2003.
"DCE Means Business", Kathryn E. DeNitto, DCE Technology Manager, Mar. 20, 1995, http://www.opengroup.org/dce/, last accessed Feb. 26, 2003.
(Distributed Application Software: Architecture and Design . Slide Show. US:The Cushing Group, Inc., 1992-1993.
Edwards, Jeri, with Deborah DeVoe, "Wells Fargo Leads the Way to Internet Banking." *Three-Tier Client/Server at Work* 1997:107-130 (Ch. 6).
Edwards, Nigel, and Owen Rees, "Distributed Objects and the World Wide Web." (ANSA) Cambridge, UK, Architecture Projects Mgmt., Ltd., Aug. 24, 1994.
Samuel C. Kendall, Jim Waldo, Ann Wollrath and Geoff Wyant, "A Note on Distributed Computing", TR-94-29, Sun Microsystems, http://research.sun.com/techrep/1994/abstract-29.htmI, last access Feb. 24, 2003.
Orbix Advanced Programmer's Guide, Release 1.3. 1. Dublin, Ireland: IONA Technologies, Ltd., Feb. 1995.
The Orbix Architecture. Dublin, Ireland: IONA Technologies, Ltd., Aug. 1993.
Orbix.Programmer's Guide, Release 1.3. Dublin, Ireland: IONA Technologies, Ltd., Apr. 1995.
"Remote Procedure Call in a Distributed Computing Environment", The Open Software Foundation, 1990, http://www.mit.bme.hu/~kiss/docs/dce/rpc.htmI, last accessed Feb. 26, 2003.
Ronayne, Michael L., and Erik S. Townsend, "A Case Study: Distributed Object Technology at Wells Fargo Bank" (Cushing Group white paper) US:The Cushing Group, Inc., 1996.
Sirbu, Marvin, and J.D. Tygar, "NetBill: An Internet Commerce System Optimized for Network-Delivered Services." *IEEE Personal Communications*, Aug. 1995:34-39.
Smith, Mark, "Interview with Bruce MacNaughton." *Windows & Net Magazine*, Nov. 1996. Mar. 6, 2003 <http://www.winnetmag.com/Articles/Index.cfm?ArticleID=2822>.
Thomas, Gomer, ANSA Phase III: Trader Implementation with Orbix & Allbase (TC Talk, Jun. 1994). Cambridge, UK:Architecture Projects Mgmt. Ltd. Sep. 2, 1994.
Truncale, David, "CompuServe Brings NT Online." *Windows & Net Magazine*, Nov. 1996. Mar. 6, 2003 <http://www.winnetmag.com/Articles/Index.cfm?ArticleID=2822>.
*Wells Fargo Bank is First to Offer Customers Internet Access to Bank Account Balances*. San Francisco, CA: Wells Fargo Bank, May 18, 1995.
Seybold, Patricia, "Chapter 6—Provide a 360-Degree View." *Customers.com: How to Create a Profitable Business Strategy for the Internet and Beyond*. Toronto:Random House, 1998. 193-213.
Ronayne, Michael L., *The Business Case for Distributed Computing*. (Object World) San Francisco, CA:The Cushing Group, Inc., Aug. 1995.
Miailovich, Jill, "QuickXpense introduces automatic pre-population of expense reports", Business Wire, s1, p1, May 8, 1995.
"ExpressNet Bows (American Express launches online service called ExpressNet)", Information Week, n514, p. 17, Feb. 13, 1995.
American Express services go on-line, Mergers & Acquisitions, v29, n5, p. 8, Apr. 1995.
Quicken User's Guide, Intuit, p. 206, Oct. 1992.
Everest, "Database Management", McGraw-Hill series in Management Information Systems, 1986, ISBN: 0-07-019781-4.

\* cited by examiner

File  Edit  Services  Mail  Special  Window  Help

------>Last Month's Statement

CONDUCTOR Card Review

Electronic Statement

Name(s):      JOHN DOE, JANE DOE
User ID:      73987,4321
Account Number:  0123456787654321

| | | Account Summary | |
|---|---|---|---|
| Credit Line | 7,500.00 | Previous Balance | 4,960.89 |
| Closing Date | 06/15/94 | Purch./Other Charges | 151.30 |
| Payment Due Date | 07/10/94 | Cash Advances | 0.00 |
| | | Credits | 0.00 |
| Amount Due | | Payments | 100.00 |
| New Balance | 5,012.19 | Late Payment Charge | 0.00 |
| or | 0.0 | Finance Charge | 0.00 |
| Minimum Payment | 100.00 | | |
| | | New Balance | 5,012.19 |

| Post Date | Description | SIC | Tranx Date | City, State | Amount |
|---|---|---|---|---|---|
| 06-13 | BOOK STORE 1 | 5542 | 06-11 | WEST PATTERS, NJ | 1.90 |
| 06-13 | RESTAURANT 1 | 5661 | 06-11 | DUBLIN, OH | 47.22 |
| 06-14 | PAYMENT RECEIVED, THANK YOU | | | | 100.00PY |
| 06-14 | MERCHANT 1 | 7549 | 06-07 | MONTCLAIR, NJ | 35.00 |
| 06-14 | GAS STATION 1 | 5541 | 06-10 | WESTFIELD, NJ | 22.41 |
| 06-14 | HOTEL 1 | 5734 | 06-12 | NEWARK, NJ | 19.95 |
| 06-15 | PHARMACY 1 | 5912 | 06-12 | MONTCLAIR, NJ | 14.82 |

FIG-5

File  Edit  Services  Mail  Special  Window  Help

------>Current Month's Statement

CONDUCTOR Card Review

Account Summary

Name(s):         JOHN DOE, JANE DOE
User ID:         73987,4321
Account Number:  0123456787654321

Credit Line         7,500.00
Current Balance     5,244.62
Available Credit    2,255.38

Last Statement:
  Balance        5,012.19
  Closing Date   06/15/94

Account Activity Since Last Statement

| Post Date | Description | SIC | Tranx Date | City, State | Amount |
|---|---|---|---|---|---|
| 06-20 | PHONE COMPANY 1 | 5251 | 06-17 | MONTCLAIR, NJ | 158.36 |
| 06-22 | AIRLINE 1 | 5411 | 06-18 | AIRFIELD, CT | 53.23 |
| 06-22 | HOTEL 2 | 5541 | 06-19 | OMAHA, NE | 20.84 |

FINANCIAL INFORMATION ACCESS SYSTEM

This application is a continuation of U.S. patent application Ser. No. 08/541,045 filed Oct. 11, 1995, now abandoned.

BACKGROUND AND SUMMARY OF THE INVENTION

The present invention relates generally to a system for accessing data related to financial transactions. Particularly, users of the Internet or an online information service such as CompuServe® may access data related to their own financial transactions that were posted as recently as the previous day.

Financial information is typically reported to financial service customers in monthly or quarterly written statements. For example, credit card companies send monthly statements that list all transactions and an outstanding balance for the reporting period. Banks and brokerages may also use written statements to report activity. Whether the statements are monthly or quarterly, by the time they reach the customer, they rarely reflect the current state of the account. Several days or weeks may pass between the time the reporting period ends and the statement is received because time is needed to process, print, and send the statements. As a practical matter, financial institutions need to establish a cut off date for reporting account activity.

Although account activity reporting cycles are rather lengthy (e.g., quarterly or monthly), customers may be interested in weekly or daily activity reports. Consequently, customers have a need to obtain recent financial information that would not otherwise be available for weeks or months. Customers also have a need to access the recent financial information at their own convenience—preferably from anywhere and at any time. Following access to the financial information, customers may have a need to communicate with the financial services provider. For example, a customer may have a question about a transaction or following review of the transactions, a customer may wish to submit a payment electronically. Finally, customers need to see the financial data presented in an organized and understandable format.

The present invention (Conductor$^{SM}$) is a suite of online financial services. Supported functions include credit card account lookup and reporting, and checking and bill paying. In addition, customers and financial services providers may communicate with each other. For example, Conductor allows customers to view and use financial information concerning recent activity in various accounts. Specifically, financial data relating to credit and debit card transactions are available through the Internet or an online information service the day after the transactions are posted. The ability to provide such recent credit and debit card transaction data to users of the Internet or an online information service is unique to the present invention.

The present invention is a sophisticated computerized system of financial services based on the TCP/IP protocol suite. Consequently, the services are available through the Internet. Alternatively, the same services may be made available directly through an online information service such as CompuServe®. In the preferred embodiment, the invention is described in relation to its accessibility through the Internet. Conductor is implemented as a distributed "information cluster" located on the global Internet so it may be accessed from a variety of presentation tools. An example of the type of information available from Conductor is financial data relating to credit and debit card transactions processed daily by a financial services provider. The financial data are transmitted daily to Conductor so that users of the Internet or an online information service may access financial data relating to their own credit and debit card transactions. The financial data may also be transmitted for further processing to an accounting, word-processing, or spreadsheet software package running on the users computer.

The system of the present invention has several advantages over known financial information access methods. Conductor may be accessed at any time from around the world because it is part of the global Internet. In an alternative embodiment, Conductor may be accessed directly through an online information service such as CompuServe®. With either embodiment, it may be accessed using any one of a number of presentation tools. Because of its ties to financial services providers, Conductor allows credit or debit cardholders to review account activity regarding postings that occurred as recently as the previous day. Cardholders use familiar access methods to view and download the financial data. Finally, the present invention allows the financial data to be organized for direct transmission to popular accounting, word-processing, and spreadsheet programs. Due to the sophistication of the process used for converting and downloading data to the other programs, data may be downloaded as frequently as the user desires. These advantages and others are explained further by the accompanying drawings and detailed description.

DETAIL DESCRIPTION OF PREFERRED EMBODIMENT(S)

Applying principles of modularity and abstraction, distributed systems technologies are used to create the architecture necessary for delivering diverse types of services over a wide area network. Sources of data may be as varied as the interfaces to it. The Conductor$^{SM}$ System is based on a Client/Server model so that it is easily extensible. It is implemented as a platform-portable, language-independent distributed object framework. Use of the distributed approach permits the easy integration of new services and providers for the system. For example, the Conductor System may easily serve as a back-end resource for existing online service providers. The distributed approach also allows the system to be accessible through a number of interfaces: for example, native Microsoft® Windows™ applications, hyper-text mark-up language (HTML) browsers, text-terminals, X.25 transactions, even voice telephony.

Figure 1:
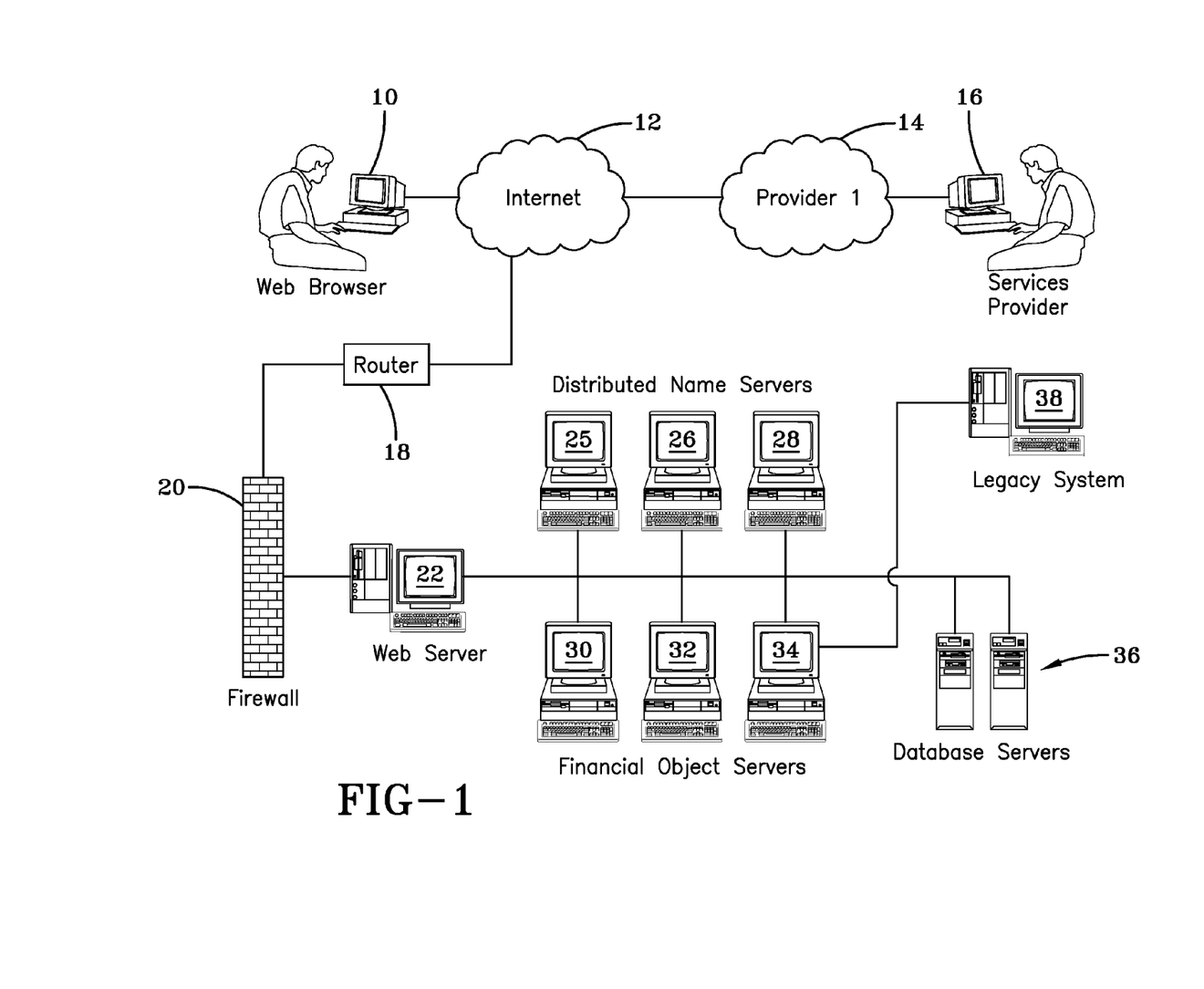
FIG. 1 is a diagrammatic view of one embodiment of the present invention.

Referring to FIG. 1, a diagrammatic representation of access to the Conductor$^{SM}$ Network is shown. Preferably, users connect to the Conductor suite of online financial services via the Internet 12. Methods for providing services via the Internet are well-known in the art and are not explained here. Conductor host computers are accessible world-wide from any site with TCP/IP name resolution and packet routing to the conductor.com domain. Preferably, host computers running the Windows NT™ Operating System and the UNIX® Operating System are used in the distributed environment. Clients and servers may run on any of twenty operating systems. Multiple user interfaces to Conductor are implemented as different types of clients. As shown in FIG. 1, a user may communicate with Conductor via a web browser 10 or via the CompuServe Information Service 14 using the CompuServe Information Manager for Windows (Win-CIM®) 16. Other methods of access may be used as well—for example, a native Microsoft® Windows™ application. In addition, Conductor may be implemented as part of an online information service so that it is available only to subscribers of the online information service.

As shown in FIG. 1, packets destined for Conductor are routed 18 to a Web Server 22 for processing. Because security is a significant issue for online financial information systems, a Firewall 20 is established between the Router 18 and the Web Server 22. User verification and data access may then occur in a secure environment. Separate user connect/data access protocols isolate internal/external networks. An indirect method of user identification is used to secure account numbers and sensitive data are passed via two-key encryption. Token passing is used for connected host identification.

To provide the features of the present invention, Conductor is built on a Common Object Request Broker Architecture (CORBA)-compliant Distributed Object Computing Platform. This development platform is well-known in the art and is not explained here. Primary system components include Object Servers, Name Lookup Servers, and Data Servers. Other components include Communication, Security, and Logging servers. As shown in FIG. 1, a number of Name Servers 24, 26, 28 and Financial Object Servers 30, 32, 34 may be in operation at one time. These servers may communicate with a Legacy System 38 or other Database Servers 36 in order to respond to specific requests for information. Data requests may be serviced in any one of a number of ways. For example, data may be accessed using a Microsoft® SQL Server running on Windows NT™.

Clients have an object-oriented Application Programming Interface (API) to distributed resources or services using a class-like construct called an "Interface" which groups operations and attributes. Because clients know only the nature of the Interface, it may be implemented in any manner. For example, Interfaces may be implemented in one language and clients in another. The implementation of an Interface may then be altered at will without affecting any clients. As long as the protocol to the Interface is stable, the client implementation is stable.

Clients located anywhere on the global Internet ask for and bind to services by name. Clients locate Interfaces by naming a server which implements one, and they may do so from any site with a TCP connection to the Conductor domain. The names of servers are provided by a name lookup Interface which runs on the only host whose name client applications need to know. The access is synchronous and call-level using either C++, Smalltalk, or C. In other words, clients access services by making standard synchronous procedure calls. Client load is automatically apportioned among all ready object servers at lookup time.

There are several benefits to using name lookup to connect clients and servers. A name lookup layer isolates clients from the location or readiness of any individual object server. Although the system is based on the Internet Protocol (IP), clients are completely isolated from back-end data sourcing concerns and do not need to know the IP addresses of object servers. Using this approach, servers may be added simply by connecting to the network, installing system and server software, and adding the machine name to the lookup database. Consequently, clients are not affected by database, network, operating system, hardware platform, or server architectural changes. For example, native 32-bit Windows™ applications may use client-side abstraction libraries that hide details of binding to and executing calls on remote objects. Objects may be implemented on cheap, fast Intel-based Windows NT™ servers and new servers may be added to the system by copying files over and adding the host name to a single locator file. The distributed nature of the system means that it is composed of relatively simple applications that implement a single interface or a small group of interfaces.

The interface between a client and a server is binary. Such an interface is more efficient and the data may be useful in more varied applications. Binary data may be converted to text for viewing by humans, sent in binary form to other providers, or retrieved in binary form and processed by a consumer application. Binary objects may be dragged off of a window and dropped into a finance application or they may be used to generate reports.

A suite of online interfaces may be used by applications, service providers, and other clients to manipulate financial information available through Conductor. An application-level protocol specifies how a client interprets data sent to it by a server. When one part of the application needs something, it calls a procedural interface in another part. Such calls do not return until the procedure has executed so the flow of control is simple and direct. Extending these synchronous procedure calls across the network interface has the advantage of simplifying the access to distributed resources by elevating it to the level of standard procedural mechanisms familiar to a majority of developers.

Figure 2:
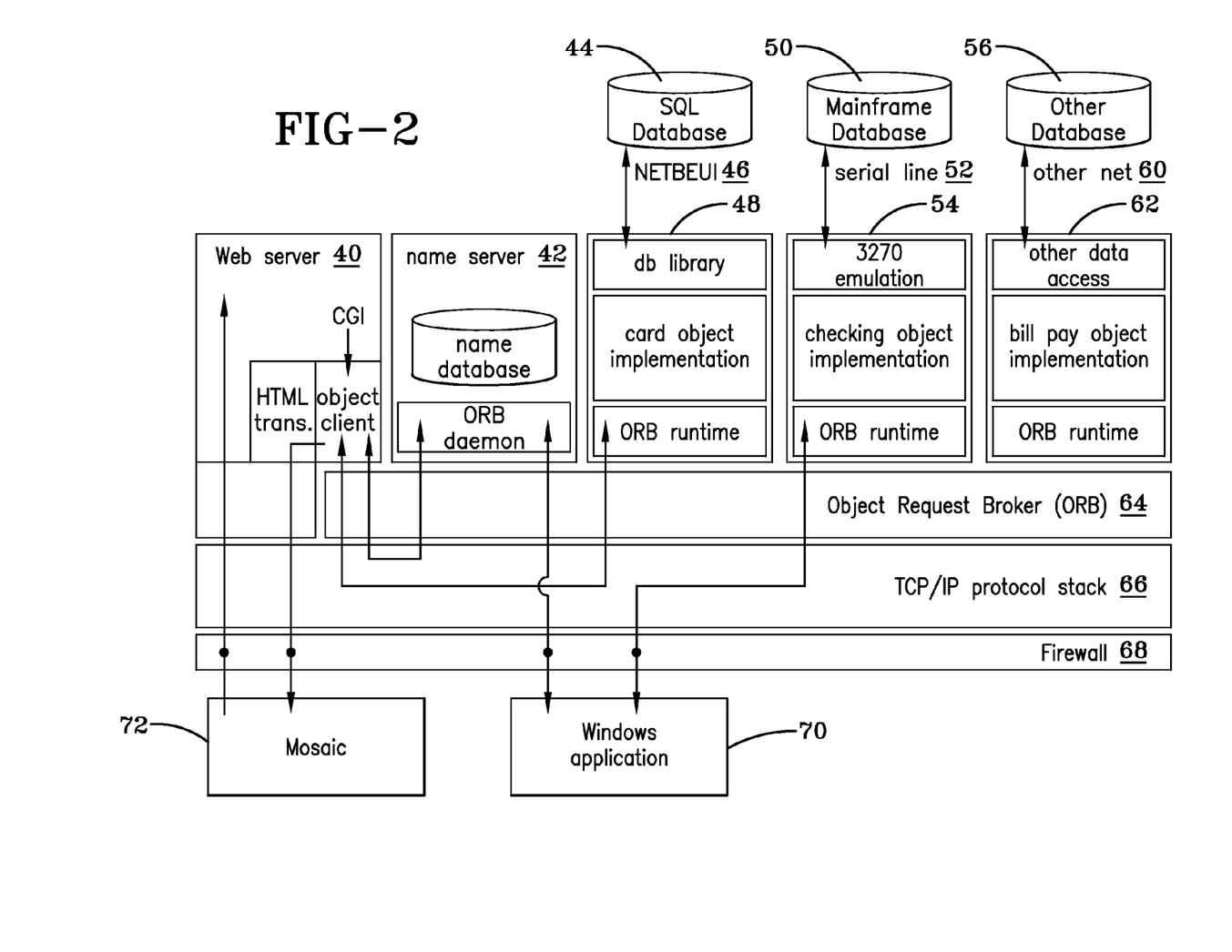
FIG. 2 is a block diagram of the system architecture of the present invention.

Referring to FIG. 2, a diagram of the Conductor® System Architecture is shown. Financial information of interest to users of the system is contained in different databases 48, 50, 52 within the distributed environment. Each database has its own access mechanism 42, 44, 46. As explained earlier, among the methods for accessing the system are a web browser 10 that communicates through a Web Server 22 or a native Windows™ application 12.

The Firewall 20 increases system security. The TCP/IP protocol stack 12 is the Internet communication vehicle. The Object Request Broker (ORB) 40 is an "information bus" that connects clients to the objects they need in a heterogeneous environment. By definition, an ORB is platform independent, language neutral, and may run in many networked environments. ORBs implemented in one language may communicate with those implemented in another, on a completely different hardware platform. The same is true for the object implementations to which the ORB provides access. Three example objects are shown in FIG. 2—a card object 30, a checking object 32, and a bill pay object 34. The objects serve as links between clients 10, 12 and data contained in the databases 48, 50, 52. The name server 24 performs the name lookup function for clients so they may establish communication with the object that performs the needed services.

Figure 3:
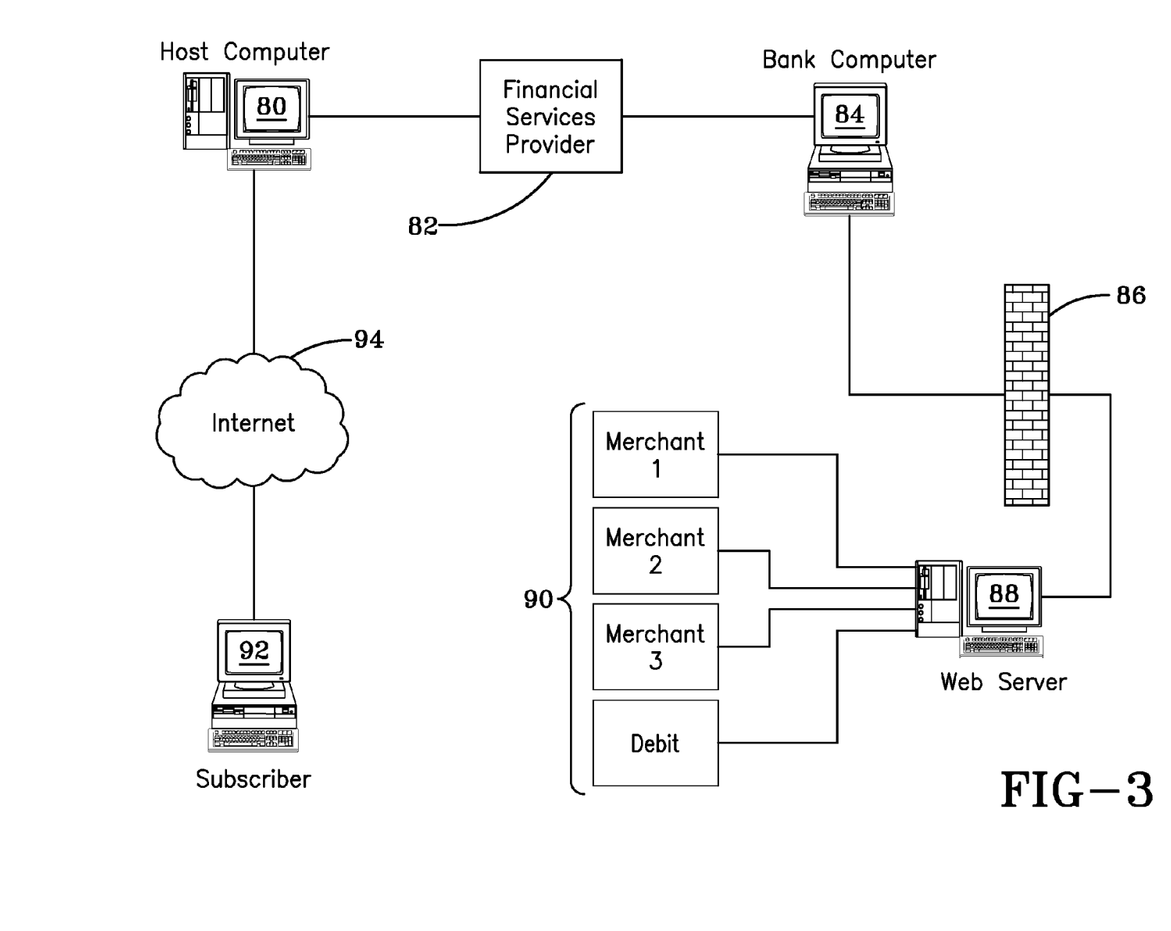
FIG. 3 is a diagrammatic representation of the processing of a financial transaction.

Referring to FIG. 3, a diagrammatic view of a sample transaction processed by the present invention is shown. Financial transaction data originates at a retail establishment. A purchase may be made with a bank card such as a Visa® or MasterCard® credit card or a bank debit card 74. The transaction is processed at the merchant location through a dial terminal 72 or any other device in communication with an authorization or settlement center 70. The authorization/settlement system 70 determines whether a particular transaction should be approved. An approved transaction represents an obligation for the cardholder to pay money to the financial institution that issued the card.

Approved transactions may then be reported to the purchaser's bank 68 as well as other supporting financial institutions for further processing before transmission to a financial services provider 66 in communication with a Conductor host computer 64. The financial services provider 66 functions as a repository for financial transactions originating from a variety of sources and supported by a large number of financial institutions and processing centers (i.e., different banks, clearing houses, authorization centers, etc.). Transactions may follow varied paths before arriving at the financial services provider 66. After transmission to the financial services provider 66, the transactions may be organized and sorted for transmission to a Conductor host computer 64. After the data are available on the host computer 64, a Conductor user may access the database via the Internet 62 or through a native Windows™ application according to the method described above.

Figure 4:
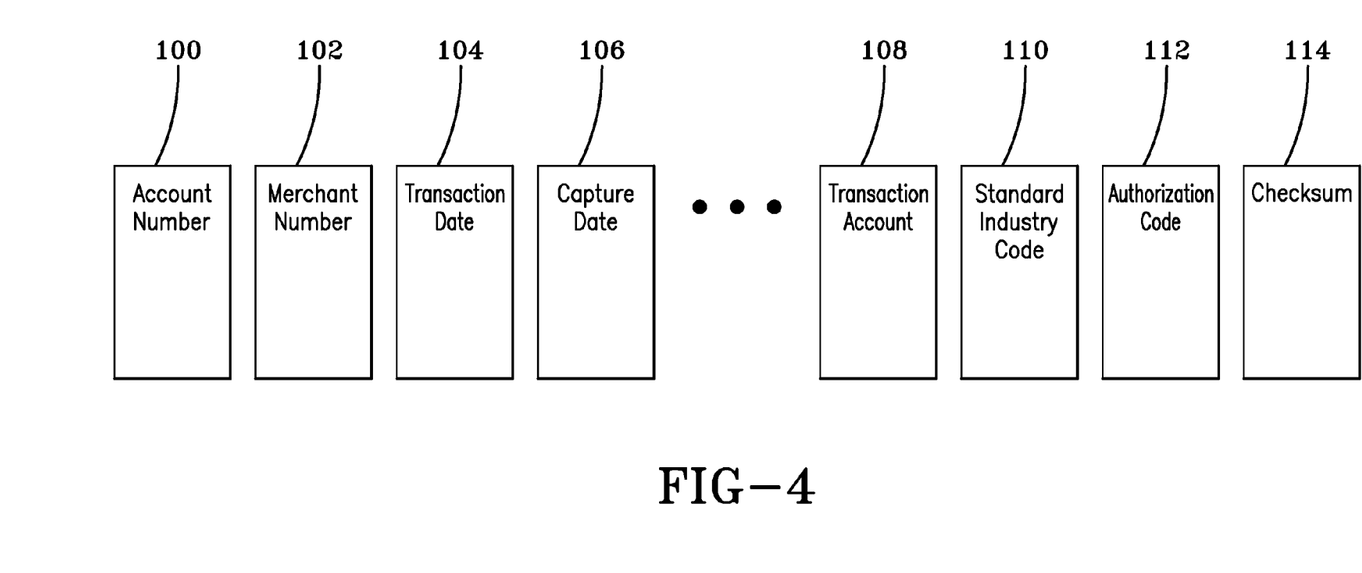
FIG. 4 is a diagrammatic representation of a financial transaction.

Referring to FIG. 4, a diagrammatic representation of an individual financial transaction is shown. Preferably, for each credit or debit card transaction, the data for each record includes the following:

| | |
|---|---|
| Account number 80: | unique series of digits to identify cardholder. Also identifies issuer and type of financial transaction card. |
| Merchant number 82: | unique series of digits to identify merchant for transaction. May be used to look up a textual description for the merchant. |
| Transaction date 84: | the date on which a transaction occurs. |
| Capture date 86: | the date on which a transaction is processed. |
| Transaction amount 88: | the extent of the cardholder's obligation to the issuing financial institution. |
| Standard industry code 90: | an unique code identifying the type or category of the transaction. |
| Authorization code 92: | number assigned to a merchant sale that has received specific approval. |
| Checksum 94: | value based on transaction data calculated and appended to transaction record to aid in verifying integrity of transmissions. |

Although a preferred format is described, other data formats may be used. Also, the same data may be organized within a record in any manner.

Preferably, transactions stored in the database are accessible according to cardholder account number. In addition to processing individual financial transactions for each cardholder, the financial services provider may summarize the transactions and create reports for each cardholder represented in the data. For example, the financial services provider may create a report that includes card balances for previous months as well as a balance for transactions occurring during the current billing cycle. The data may be organized and sorted according to a variety of selection criteria.

Referring again to FIG. 3, after organization and sorting by the financial services provider 66, the financial transaction data are transmitted to a Conductor host computer 64. Preferably, transaction data are transmitted daily to the host computer 64. Users 60 then request access via the Internet 62 to the financial transaction data stored on the host computer 64. Preferably, the user may choose one of several presentation tools to access the host computer.

Once connected to the host computer, the user is prompted for information needed to generate a report. For example, the user may be asked to provide an account number, a personal identification number, and a request for either the current month's statement or the previous month's statement. The host computer generates the report and communicates with the session management software running on the user's computer so that the user may view the data. Preferably, the user has the option of downloading the data to an accounting program, a spreadsheet, or a word-processing program. The data may be converted to another format during the download process for use in the target program.

Figure 5:
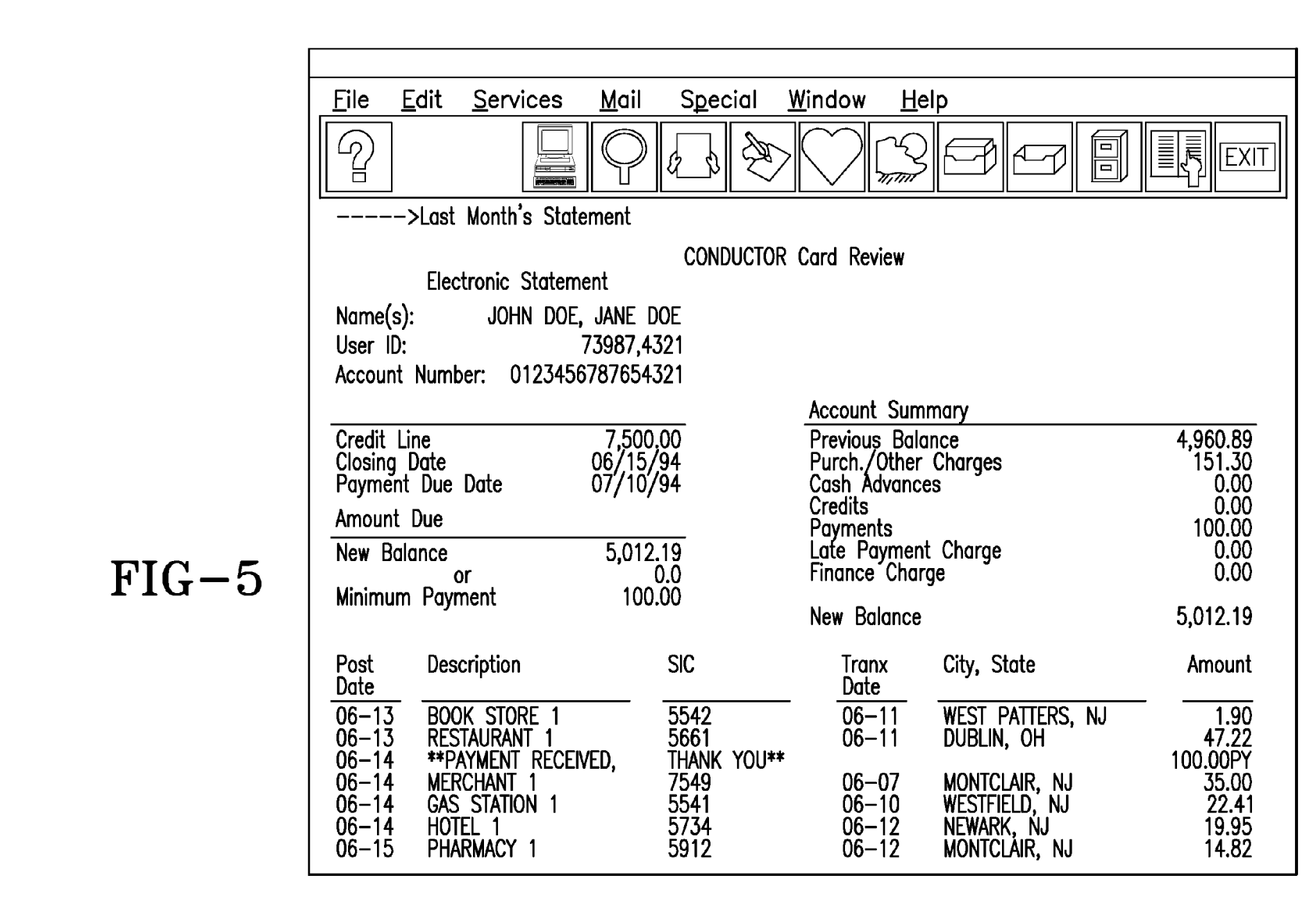
FIG. 5 is a computer screen view of financial data available to a user.
Figure 6:
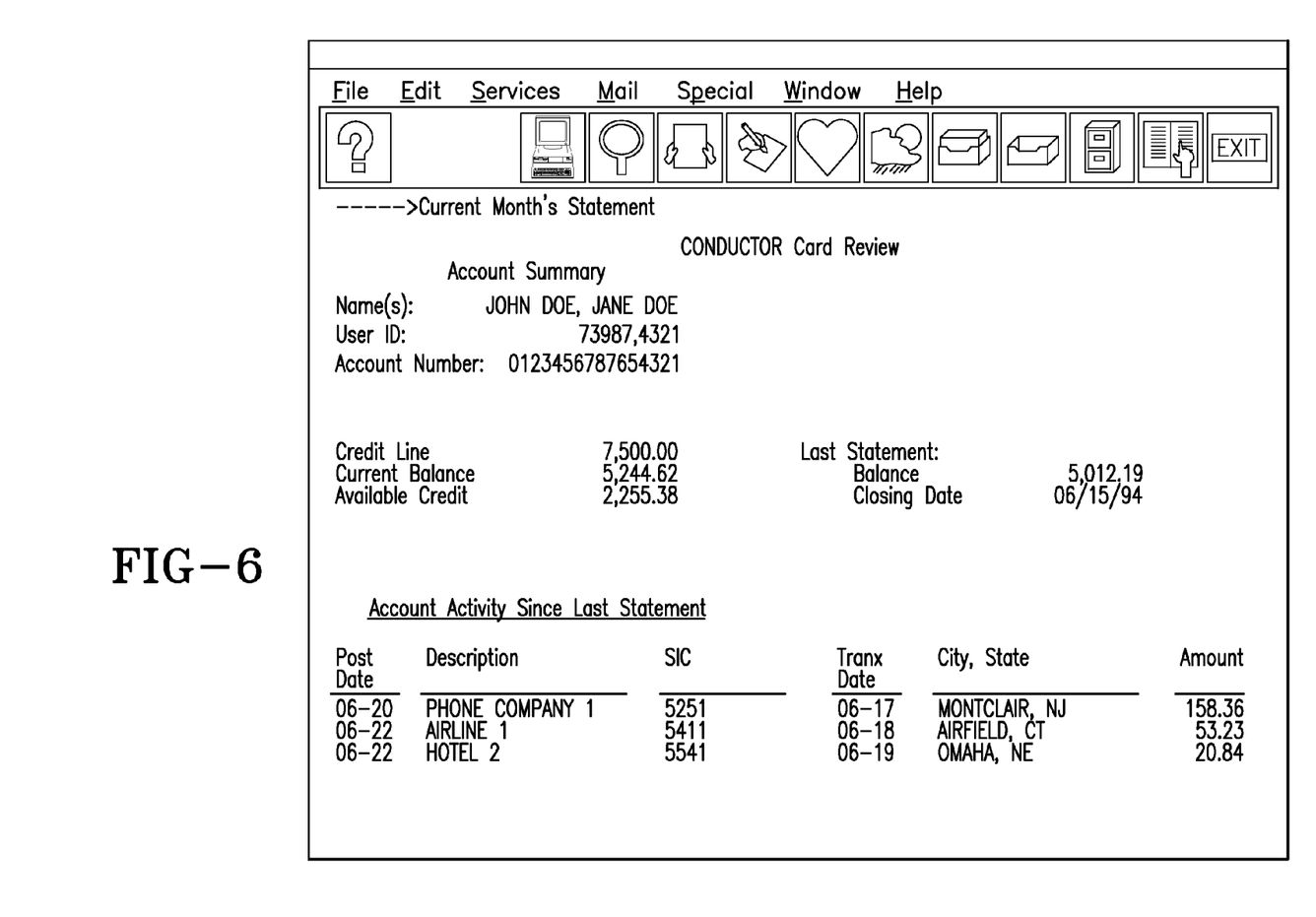
FIG. 6 is a computer screen view of financial data available to a user.

Referring now to FIG. 5, a report for a user's current month's statement is shown. The report may contain data for transactions that were posted as recently as the previous day. FIG. 6 shows a report for the previous month's statement. The present invention allows users to receive this information in a more timely manner as it is available before a statement arrives in the mail. In addition, users may access the data at their own convenience.

Preferably, users may view and manipulate only their own financial data. Furthermore, users may not alter the data. Preferably, users have the option of downloading the financial data to an accounting software package such as Intuit's Quicken® or a word-processing program such as Novell's WordPerfect®. The ability to convert and download recent credit and debit card transactions to such popular programs is unique to the present invention. The need to enter the data manually is eliminated. The sophistication of the conversion process allows data to be downloaded as frequently as the user desires. The process recognizes whether a transaction has been previously converted so users do not risk double-entering data. In addition, the data may be manipulated in a variety of ways. For example, the association of standard industry codes with each transaction allows transactions to be categorized automatically. Another benefit of the ability to review recent transactions is increased bank card security. Cardholders may detect and report unauthorized transactions within days, or possibly hours, of when they were posted thereby increasing the likelihood of locating the unauthorized user.

The present invention gives users of the Internet the opportunity to review recent credit and debit card transactions at any time and from any location. Consequently, cardholders are able to monitor card activity and determine account status daily rather than monthly or quarterly. The ability to have accurate and current information concerning financial matters is important in an age of electronic funds transfer. The present invention has been described in the form of preferred embodiments. However, several modifications and variations may be made to the invention and fall within the scope of the claims. For example, the present invention may be implemented as one of many services available through an online information service. Users of the online information service may then be given the opportunity to review recent financial transactions at any time and from any location.

What is claimed is:

1. A method for providing recent financial transaction data to a plurality of users of a web site comprising:

receiving at a first computer financial transaction data for a plurality of users of a first financial institution that provides banking services to said users;

receiving at a second computer financial transaction data for a plurality of users of a second financial institution that provides banking services to said users;

transmitting at least daily said financial transaction data from said first computer and said second computer to a database accessible from a server at said web site, said financial transaction data comprising data for purchases made at retail establishments;

prompting a first one of said plurality of users of said web site for a first account number for said user's personal financial transaction data from said first financial institution;

prompting said first one of said plurality of users of said web site for a second account number for said user's personal financial transaction data from said second financial institution;

prompting a second one of said plurality of users of said web site for a third account number for said user's personal financial transaction data from a third financial institution;

receiving at said server at said web site said first, second, and third account numbers;

requesting from said database in response to receiving said first, second, and third account numbers financial transaction data for said first account number, for said second account number, and said third account number, said request made by said server;

generating a first report comprising said financial transaction data for said first account number and said second account number, said first report generated by said server in response to receiving said first account number and said second account number;

generating a second report comprising said financial transaction data for said third account number, said second report generated by said server in response to receiving said third account number;

transmitting said first report comprising said first one of said plurality of user's personal financial transaction data for said first account number and said second account number from said server to said first one of said plurality of users of said web site; and transmitting said second report comprising said second of said plurality of user's personal financial transaction data for said third account number from said server to said second one of said plurality of users of said web site, wherein financial transaction data from said first report and said second report may be downloaded to a target program on a respective user's computer.

2. The method of claim 1 wherein said financial transaction data in said first report is transmitted to an accounting software package at said first one of said plurality of users' computer.

3. The method of claim 1 wherein presenting said first report comprising said financial transaction data for said first account number and said second account number comprises presenting said financial transaction data in a browser.

4. The method of claim 1 wherein presenting said first report comprising said financial transaction data for said first account number and said second account number comprises presenting said financial transaction data in an online information service application.

5. The method of claim 1 wherein said financial transaction data originates from a plurality of processing centers.

6. The method of claim 1 wherein said first computer is a financial services provider computer.

7. A system for providing recent financial transaction data to a plurality of users of a web site comprising:

a first computer for collecting financial transaction data for a plurality of users of a first financial institution that provides banking services to said users;

a second computer for collecting financial transaction data for a plurality of users of a second financial institution that provides banking services to said users;

a server at said web site for receiving at least daily said financial transaction data from said first computer and said second computer, said financial transaction data comprising data for purchases made at retail establishments;

a database for storing said financial transaction data received at least daily from said first computer and said second computer;

a first request from a first one of said plurality of users of said web site for said first user's personal financial transaction data associated with a first account number from said first financial institution and for said first user's personal financial transaction data associated with a second account number from said second financial institution;

a second request from a second one of said plurality of users of said web site for said second user's personal financial transaction data associated with a third account number from a third financial institution;

financial transaction data from said database for said first account number, said second account number, and said third account number wherein said financial transaction data for said first account number and said second account number and said financial transaction data for said third account number is retrieved from said database by said server in response to said receiving said first request and said second request at said server;

a first report generated by said server for presentation to said first one of said plurality of users, said first report comprising said first user's financial transaction data from said database for said first account number and said second account number; and a second report generated by said server for presentation to said second one of said plurality of users, said second report comprising said second user's financial transaction data from said database for said third account number, wherein financial transaction data from said first report and said second report may be downloaded to a target program on a respective user's computer.

8. The system of claim 7 wherein said target program is an accounting software package at said first one of said plurality of users' computer for receiving said financial transaction data.

9. The system of claim 7 wherein said financial transaction data is presented to said first one of said plurality of users in a browser.

10. The system of claim 7 wherein said financial transaction data is presented to said first one of said plurality of users in an online service information application.

11. The system of claim 7 wherein said financial transaction data originates from a plurality of processing centers.

12. The system of claim 7 wherein said first computer is a financial services provider computer.

13. A method for providing through a web site financial transaction data to a card user comprising:

collecting at a plurality of computers financial transaction data for a plurality of card users of a plurality of financial institutions that provide banking services, said financial transaction data comprising data for purchases made at retail establishments by said card users;

transmitting at least daily said financial transaction data for said plurality of card users of said plurality of financial institutions from said plurality of computers to a database accessible from a server at said web site;

determining a first account number associated with a first one of said plurality of financial institutions for said first one of said plurality of card users when said first one of said plurality of card users accesses said web site;

determining a second account number associated with a second one of said plurality of financial institutions for said second one of said plurality of card users when said second one of said plurality of card users accesses said web site;

retrieving from said database said financial transaction data associated with said first account number in response to said first one of said plurality of card users accessing said web site;

generating a first report comprising said financial transaction data associated with said first account number;

transmitting to said first card user's computer said first report comprising said financial transaction data associated with said first account number;

retrieving from said database said financial transaction data associated with said second account number in response to said second one of said plurality of card users accessing said web site;

generating a second report comprising said financial transaction data associated with said second account number;

transmitting to said second card user's computer said second report comprising said financial transaction data associated with said second account number, wherein financial transaction data from said first report and said second report may be downloaded to a target program on a respective user's computer.

14. The method of claim 13 wherein downloading said financial transaction data to a target program comprises downloading said financial transaction data to an accounting software package at said first card user's computer.

15. The method of claim 13 wherein transmitting said first report comprising said financial transaction data associated with said first account number comprises transmitting said financial transaction data to a browser.

16. The method of claim 13 wherein transmitting said first report comprising said financial transaction data associated with said first account number comprises transmitting said financial transaction data to an online information service application.

17. The method of claim 13 wherein said first card user is selected from the group consisting of credit card users and debit card users.

18. The method of claim 13 wherein said financial transaction data originates from a plurality processing centers.

19. The method of claim 13 wherein one of said plurality of computers is a financial services provider computer.

20. A system for providing recent financial transaction data to a card user comprising:

a first computer for collecting financial transaction data for said card user from a first financial institution that provides banking services to said card user, said financial transaction data comprising data for purchases made at retail establishments;

a second computer for collecting financial transaction data for said card user from a second financial institution that provides banking services to said card user, said financial transaction data comprising data for purchases made at retail establishments;

a server at a web site for receiving at least daily said financial transaction data from said first and second computers;

a database for storing said financial transaction data received at least daily;

an account number for said card user of said web site, said account number associated with said first financial institution or said second financial institution;

a request from said card user for financial transaction data associated with said account number;

financial transaction data from said database for said account number retrieved by said server in response to receiving said request from said card user;

a report generated by said server comprising said financial transaction data from said database for said account number, wherein said report comprising said financial transaction data for said account number is presented to said card user and said financial transaction data from said report may be downloaded to a target program on said card user's computer.

21. The system of claim 20 further wherein said target program is an accounting software package at said card user's computer for receiving said financial transaction data associated with said account number.

22. The system of claim 20 wherein said report comprising said financial transaction data associated with said account number is presented to said card user in a browser.

23. The system of claim 20 wherein said report comprising said financial transaction data associated with said account number is presented to said card user in an online information service application.

24. The system of claim 20 wherein said card user is selected from the group consisting of credit card users and debit card users.

25. The system of claim 20 wherein said financial transaction data originates from a plurality of processing centers.

26. The system of claim 20 wherein said first computer is a financial services provider computer.

27. A method for providing recent financial transaction data to a user of a web site comprising:

collecting at a first computer financial transaction data for said user from a first financial institution that provides banking services to said user;

collecting at a second computer financial transaction data for said user from a second financial institution that provides banking services to said user;

transmitting from said first and second computer to a database accessible from a server at said web site said financial transaction data for said user wherein said financial transaction data relates to transactions for purchases made at retail establishments posted the previous day;

confirming the identity of said user when said user accesses said web site;

determining an account number for said user for said first financial institution;

requesting from said server at said web site financial transaction data for said account number from said database when said user accesses said web site;

generating at said server a report comprising said financial transaction data for said account number; and transmitting said report comprising said financial transaction data for said account number to said user's computer, wherein said financial transaction data from said report may be downloaded to a target program on said user's computer.

28. The method of claim 27 wherein said financial transaction data comprises credit card transaction data.

29. The method of claim 27 wherein said financial transaction data comprises debit card transaction data.

30. The method of claim 27 wherein said financial transaction data comprises credit card data and debit card transaction data.

31. The method of claim 27 wherein said user is prompted for said account number to generate said report.

32. The method of claim 27 further wherein downloading said financial transaction data to a target program comprises downloading said financial transaction data to an accounting program at said user's computer.

33. The method of claim 27 wherein said first computer is a financial services provider computer.

34. A system for providing recent financial transaction data from a plurality of financial institutions to users of a web site comprising:
- financial transaction data relating to purchases made at retail establishments for a first user for a first financial transaction at a first one of said plurality of financial institutions that provide banking services;
- financial transaction data relating to purchases made at retail establishments for said first user for a second financial transaction at a second one of said plurality of financial institutions that provide banking services;
- financial transaction data relating to purchases made at retail establishments for a second user of a third financial transaction at a third one of said plurality of financial institutions that provide banking services;
- a computer for collecting said financial transaction data for said first financial transaction, said financial transaction data for said second financial transaction and said financial transaction data for said third financial transaction;
- a database accessible from a server at said web site for receiving from said computer within 24 hours of posting said financial transaction data for said first financial transaction, said financial transaction data for said second financial transaction, and said financial transaction data for said third financial transaction;
- a process for verifying the identity of said first user and said second user when said users access said web site;
- a first account number for said first user for accessing said first user's financial transaction data;
- a second account number for said second user for accessing said second user's financial transaction data;
- a request for obtaining from said server at said web site financial transaction data for said first account number and financial transaction data for said second account number;
- a first report generated by said server in response to said request and transmitted to said first user's computer, said first report comprising financial transaction data for said first account number; and
- a second report generated by said server in response to said request and transmitted to said second user's computer, said second report comprising financial transaction data for said second account number,
- wherein financial transaction data from said first report and said second report may be downloaded to a target program at a respective user's computer.

35. The system of claim 34 wherein said financial transaction data for said first financial transaction comprises credit card transaction data.

36. The system of claim 34 wherein said financial transaction data for said first financial transaction comprises debit card transaction data.

37. The system of claim 34 wherein said financial transaction data from said first financial transaction comprises credit card transaction data and said financial transaction data for said second financial transaction comprises debit card transaction data.

38. The system of claim 34 wherein said first user is prompted for information to generate said report.

39. The system of claim 34 further wherein said target program is an accounting program at said user's computer for downloading said financial transaction data for said first financial transaction and said financial transaction data for said second financial transaction.

40. The system of claim 34 wherein said computer is a financial services provider computer.

* * * * *